United States Patent Office 2,871,879
Patented Feb. 3, 1959

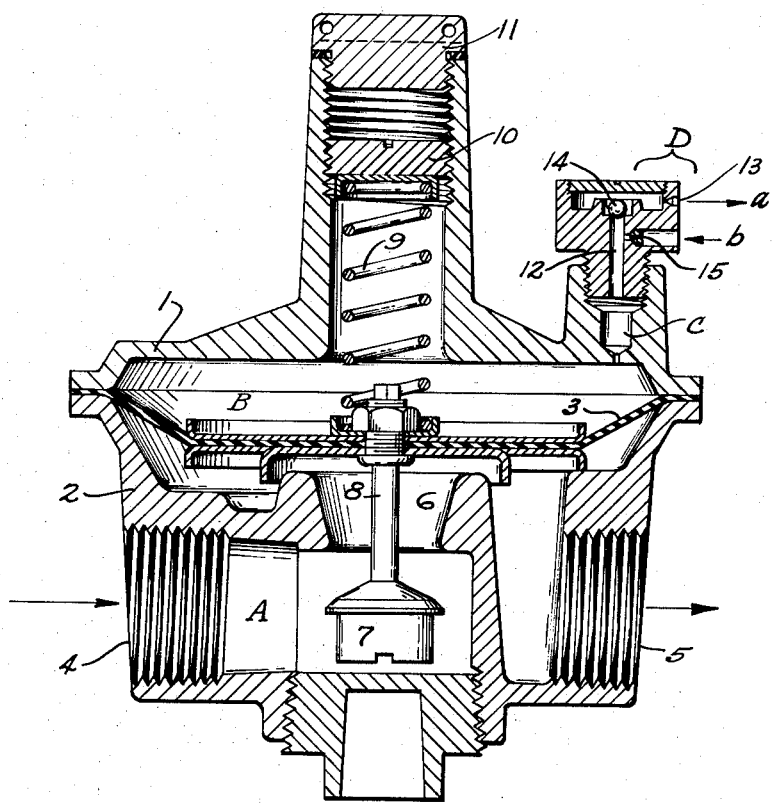

2,871,879

GAS PRESSURE CONTROL MEANS

Edward R. Downe and Ward B. Travers, Elyria, Ohio, assignors, by mesne assignments, to The C. A. Olsen Manufacturing Company, a corporation of Delaware Application July 7, 1955, Serial No. 520,472

1 Claim. (Cl. 137—513.7)

This invention relates to means for controlling the pressure of fuel gas supplied to the burner of a furnace or the like.

The invention employs as a part thereof, an automatic regulator a purpose of which is to maintain a uniform pressure of gas supplied to the burner, independent of fluctuation of source pressure during burner operation. Such type of regulator is well known in the art, as is its typical employment in installation immediately ahead of a thermostatically controlled on-off valve which in turn is located immediately ahead of the burner.

In some installations, conditions are such that should the burner receive gas instantly at full operating pressure immediately at the commencement of the operating phase of its cycle, malfunctioning might occur, as due to the cold condition of burner surroundings.

Thus, more particularly, there may be a short interval before the products of combustion from the burner can overcome the inertia of the volume of cold air in the combustion chamber, and establish a free and normal flow to the chimney. During this interval, combustion at the burner is incomplete, the burner flame may extinguish the pilot, and tend to roll out through the burner access panel of the furnace.

An object of this invention is to provide that at the commencement of burner operation gas is supplied thereto at pressure gradually increasing sufficiently slowly to insure satisfactory attainment of the desired burner operation.

Another object of the invention is to accomplish this purpose by very slight, simple and inexpensive modification of the automatic regulator which is in wide use as a standard part in such installations.

Further objects and advantages will be apparent from the following description taken in connection with the accompanying drawing, which is a longitudinal section through a gas pressure regulator as modified according to our invention, arrows indicating directions of flow.

The regulator has a body principally formed of a cooperatively pair of members 1 and 2, peripherally flanged to secure a diaphragm 3 therebetween, and interconnected as by bolts not appearing in the drawing, extending through the flanges and the diaphragm.

The portion 2 of the body has a through passageway A leading from an inlet opening 4 to an outlet opening 5 by way of a valve opening 6 located upstream of the diaphragm 3.

The body has a cavity B, above the diaphragm and separated thereby from the passageway A.

A valve 7 for the opening 6 and located upstream thereof, is connected to the diaphragm 3 as by a stem 8, extending through the opening 6.

A spring 9 may be provided, adjustable as by a screw 10, accessible by a closure 11 which effectively forms part of the body.

The body is provided with a vent opening, as generally indicated at C, communicating with the chamber B above the diaphragm 3.

What has thus far been described constitutes a typical gas pressure regulator well known for many years in the art, and widely employed for service of a burner by installation in its gas supply line immediately ahead of the thermostatic valve which instantly, automatically and completely opens responsive to call for heat or satisfaction thereof by the thermostat.

In operation, when the thermostatic valve is closed, full line pressure is effective on the diaphragm 3 to close the regulator valve 7. When the thermostatic valve opens, drop in pressure beneath the diaphragm will cause it to move the regulator valve to the open position indicated in the drawing, whereupon variation in pressure effective on the diaphragm will adjust the valve 7 with throttling effect to maintain constant pressure at the regulator outlet 5.

During such operation, there will be air flow through the vent C above the diaphragm, for relief of the expansible chamber B to maintain atmospheric pressure therein, by egress during closing of the valve 7, and ingress during its opening.

In connection with the vent C, the body part 1 is provided with an opening threaded as illustrated, to receive a fititng, as for vent piping for leak limiting, as desired or required.

According to this invention, a vent fitting, as generally indicated at D, is provided having a nipple portion for mounting on the body part 1 at the vent C.

As illustrated, the fitting has a through passageway including a rising portion 12 and a lateral outlet 13 providing egress from the vent C, as indicated by the arrow a. A check valve such as a ball 14 is arranged in the passageway to permit egress from the diaphragm chamber B but prevent ingress thereto. The outlet 13 may preferably be provided with a leak limiting orifice sufficiently small, in the order of .016 of an inch in diameter, to eliminate the need for vent piping, yet permit rapid movement of the valve 7 in closing direction by the diaphragm B.

In order to permit opening of the valve 7 but prevent opening movement from being too rapid, the fitting D is provided with a minute opening through orifice 15 for very limited ingress, as from surrounding atmosphere as indicated by the arrow b, and located to permit such slight ingress when the check valve 14 is seated. .005 of an inch diameter has been found sufficiently minute an orifice to accomplish the purpose of this opening in slowing down the opening movement of the regulating valve 7.

It may be noted that the minute orifice at 15 provides its limited ingress in by-pass relation to the valve 14 when the latter is seated.

We claim:

A vent fitting for upright mounting on a gas pressure regulator at the vent thereof, said fitting having a nipple end, a cavity at its other end, a central longitudinal passageway leading from said nipple end to said cavity, a closure for the mouth of said cavity, a ball check valve arranged within said cavity to seat at the mouth of said passageway, said fitting having a leak limiting orifice arranged laterally of said cavity in communication therewith and with the exterior of the body to permit limited egress of fluid therefrom, and said fitting also having a minute opening arranged laterally of said passageway in communication therewith and with the exterior of the body to permit slight ingress of fluid thereto when said valve is seated, the capacity of said minute opening being substantially less than that of said orifice.

References Cited in the file of this patent

UNITED STATES PATENTS

| | | |
|---|---|---|
| 1,844,842 | Colosimo | Feb. 9, 1932 |
| 2,138,446 | Douredoure | Nov. 29, 1938 |
| 2,302,284 | Abbott | Nov. 17, 1942 |
| 2,359,111 | Hughes | Sept. 26, 1944 |
| 2,509,839 | Panner | May 30, 1950 |
| 2,634,088 | Niesemann | Apr. 7, 1953 |

FOREIGN PATENTS

| | | |
|---|---|---|
| 1,053,484 | France | Sept. 30, 1953 |